(12) United States Patent
Guzowski

(10) Patent No.: US 6,281,442 B1
(45) Date of Patent: Aug. 28, 2001

(54) CABLE FITTING FOR THE PROTECTION OF A CABLE CONNECTION IN A MEDIUM VOLTAGE TECHNOLOGY

(75) Inventor: Bernd Guzowski, Gevelsberg (DE)

(73) Assignee: RXS Kabelgarnituren GmbH, Hagen (DE)

( * ) Notice: Subject to any disclaimer, the term of this patent is extended or adjusted under 35 U.S.C. 154(b) by 0 days.

(21) Appl. No.: 09/459,551

(22) Filed: Dec. 13, 1999

(30) Foreign Application Priority Data

Dec. 11, 1998 (DE) .............................................. 198 57 334

(51) Int. Cl.⁷ .................................................... H02G 15/18
(52) U.S. Cl. ...................... 174/73.1; 174/84 R; 174/74 R
(58) Field of Search ................... 174/73.1, 84 R, 174/88 C, 88 R, DIG. 8, 74 R

(56) References Cited

U.S. PATENT DOCUMENTS

| 4,383,131 | * | 5/1983 | Clabburn ............................ 174/73 R |
| 4,424,410 | * | 1/1984 | Edgerton ............................ 174/73 R |
| 4,431,861 | * | 2/1984 | Clabburn et al. .................. 174/73 R |
| 4,487,994 | * | 12/1984 | Bahder .............................. 174/73 R |
| 4,698,458 | * | 10/1987 | Parmigiani et al. ............... 174/73 R |
| 4,822,952 | * | 4/1989 | Katz et al. .......................... 174/73.1 |
| 4,948,222 | * | 8/1990 | Corke et al. ....................... 350/96.2 |
| 5,294,752 | * | 3/1994 | Vallauri et al. .................... 174/73.1 |
| 5,502,279 | * | 3/1996 | Mirebeau et al. ................. 174/73.1 |
| 5,900,585 | * | 5/1999 | Winfield et al. .................. 174/74 R |
| 5,973,266 | * | 10/1999 | Shreve et al. ..................... 174/74 R |
| 6,105,247 | * | 8/2000 | Varreng ............................. 29/871 |
| 6,124,549 | * | 9/2000 | Kemp et al. ....................... 174/73.1 |

FOREIGN PATENT DOCUMENTS

| 2263909 | * | 10/1973 | (DE) .................................. 174/73.1 |
| 29 37 253 C2 | | 9/1993 | (DE) . |
| 0 681 101 A2 | | 11/1995 | (EP) . |

* cited by examiner

Primary Examiner—Dean A. Reichard
Assistant Examiner—Adolfo Nino
(74) Attorney, Agent, or Firm—Schiff Hardin & Waite

(57) ABSTRACT

A cable fitting for the protection of cable connections in a medium voltage range has a shrinkable inner insulating sleeve with a field controlling or shielding element as a coating on an inner surface, a shrinkable outer protective sleeve and a protective sleeve that completely covers the arrangement. A combination of the field controlling or shielding element with the shrinkable inner insulating sleeve reduces the number of steps in forming the cable fitting on the cable connection.

14 Claims, 4 Drawing Sheets

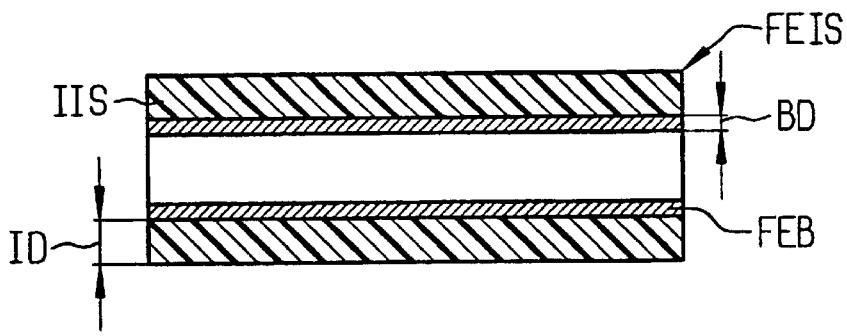
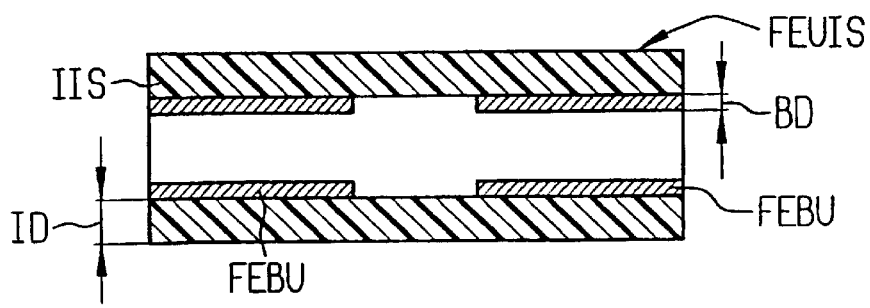
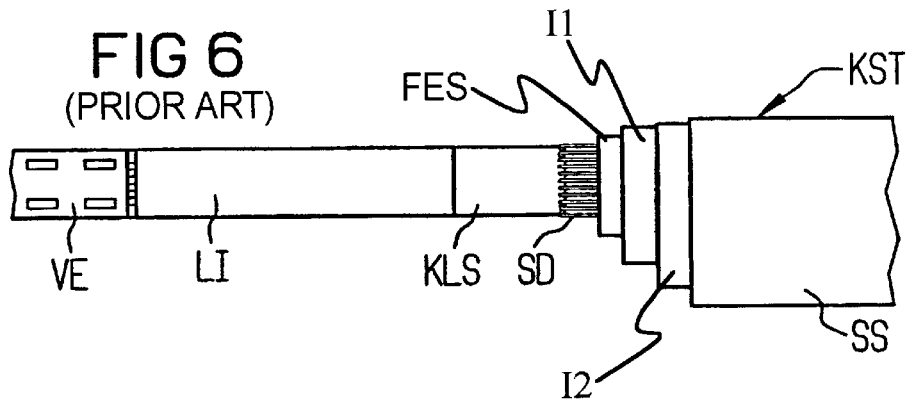
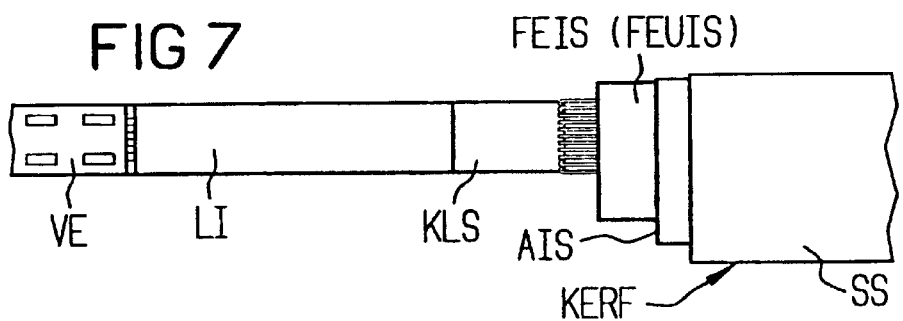

CABLE FITTING FOR THE PROTECTION OF A CABLE CONNECTION IN A MEDIUM VOLTAGE TECHNOLOGY

BACKGROUND OF THE INVENTION

The present invention is directed to a cable fitting for the protection of a cable connection in a medium voltage technology, wherein strippable cable conductors are connected to a conductive connecting element. The protection of the cable connection is accomplished by a field controlling or shielding element covering the set off edges of the cable conductive layers, a shrinkable inner insulation tube, sleeve or hose disposed on the field controlling element, a shrinkable outer insulation hose, sleeve or tube, a conductive layer and a shrinkable protective hose, sleeve or tube that completely covers the arrangement are arranged lying on top of one another from inside to outside over the joint.

Cable sleeves are notoriously known for the connection of two cables in the medium voltage region. The conductors that are to be connected are respectively contacted with a press or screw connector and are covered with means for controlling the electrical field. Shrinkable insulation hoses or tube are arranged over this means. U.S. Pat. No. 4,383,131, which claims priority from the same British Application as German 29 37 253-C2, discloses such an arrangement. The electrical field control or shield occurs with the help of a heat shrinkable field control tube or shielding sleeve. The outside diameter of this field control tube is smaller than the inside diameter of a shrinkable insulation tube that is to be arranged thereover. Thus, the field control tube or shielding tube overlaps the outside conductor layers of each cable and is not interrupted in its course across the joint. The heat shrinkable insulation tubes that are to be arranged over the field control tube are initially arranged in one another and respectively shrunken following one another onto the field control tube or sleeve, which has already been shrunken on the connection. In order to avoid the individual sleeves getting mixed up or mistaken, these are correspondingly designated or other measures have to be taken, such as diameters that are different from each other, for example. This requires a considerable manufacturing, installation and time outlay. Thus, the field control tubes, for example, are always manufactured smaller in the outside diameter than the insulating tubes or sleeves which are to be arranged thereover. As a result of this pre-customizing, it is then possible to preclude an incorrect insulation in this manner. However, the geometrical adaptation of the tubes and customizing are involved regarding the manufacturing. Potentially, a limitation concerning the shrinking region must be accepted due to the different diameters of the individual sleeves, since the outermost sleeve must be shrunken significantly more than the sleeve that lies inside. Besides, it is disadvantageous that cavities may be formed at the junctions given the utilization of these tubes or sleeves, and these cavities can lead to a partial discharge at the outer conductive layer edges of the cable. An additional band that preferably exhibits field controlling or shielding properties as well was previously utilized at these locations in order to solve such problems. Electrically conductive lacquers, with which the cavities are filled, are also utilized in order to force a defined electrical potential at the described locations and prevent partial discharges therewith.

European 0 681 010-A2 discloses a method for manufacturing a field controlling or shielding layer for medium-voltage fittings. This field controlling layer is a liquid polymer with conductive additives of granulated silicon carbide. The mix recipe contains a halogen-free solvent that evaporates after application onto the medium voltage fitting. Such field controlling sealing compounds meet all the required criteria for field controlling layers given medium voltage fittings. Moreover, different exemplary embodiments for the field controlling layer that satisfy the environmental conditions regarding solvents are specified therein, whereby the required electrical conditions are adhered to.

SUMMARY OF THE INVENTION

The present invention is based on an object of designing a cable fitting for the protection of a cable connection in the medium voltage technology, wherein the problems of the electrical field control in conjunction with an appropriate insulation manufacture are solved in a simple and time-saving manner. In particular, the partial discharge intensity is to be kept as small as possible by avoiding cavities in the joint region and by avoiding partial discharge from the beginning. Besides, the invention is based on the object of facilitating the installation with the help of the cable fitting and improving the manufacture of the product. This object is inventively achieved with a cable fitting having a field controlling or shielding element arranged as a coating on the inside surface of a shrinkable inner insulation tube or sleeve and the field controlling or shielding element can be deformed at least during the step of installing.

One clear advantage of the inventive cable fitting is that a separate sleeve that was previously the separate field controlling or shielding element is no longer necessary given the overall arrangement. Given the installation, this means that the working steps can be saved, namely the arrangement of the shrinking procedure of the separate field controlling or shielding sleeve. Furthermore, given the adaptation of the diameter, it is advantageous that there is one fewer sleeve, so that the gradation of the diameter of the sleeves which are to be shrunken on top of one another can be better fashioned. This has the result that a larger region of the cable diameter can be covered with one type of cable fitting. In addition, the tendency to form a cavity is avoided by the deformability of the field controlling or shielding element that is applied as a coating, so that partial discharges are no longer possible. Thus, for example, a field control layer or, respectively, a field controlling compound that at preferably does not contain halogen-containing solvents is applied as a field controlling element on the inside surface of the insulating tube or sleeve as a coating. Thereby, the coating of the semiconductive field controlling element must cover the joint of both cables to the extent that the field controlling element is in touch with the outer conductive layers of both cables after the installation.

The field controlling or shielding element contains, for example, a viscous, highly sticky polymer at room temperature, a highly volatile solvent at room temperature, an electrically conductive additive of granulated silicon carbonate, various additives and antioxidant agents that serve the purpose of making the element softer. The solvent is halogen-free and exhibits an evaporation factor of <10 with reference to ester. Ethylene-propylene-dienterpolymer (EPDM), for example, is appropriate as the polymer. The following solvents can be utilized, for example: Isopropanol, 2-butanone, ethylacetate, petroleum-benzine 60–80, n-hexane, cyclohexane and others. Chlorinated aliphatic hydrocarbons, chlorinated cycloaliphatic compounds, for example, are potential additional additives. Commercially-obtainable phenolic and/or aminic compounds are added as antioxidant agents.

Generally, such field shielding or controlling elements are continuously applied as a coating; however, an annular interruption is possible in the region of the press or screw connector. The materials of the applied insulation hoses exhibit properties resistant to creep current and erosion, whereby the specific volume resistivity is $\geq 10^{10}$ Ωcm. The insulation tubes or sleeves can be supplied as endless tubes, so that the respectively required length can be cut at the installation location. In general, however, it is expedient to precut manufacture expandates, i.e., expanded, shrinkable insulation tubes or sleeves, the field controlling element being then inserted as a coating at the factory in this insulation tube or sleeve. The thickness of the coating of the field controlling element is at least 1 mm, and preferably 2 mm. An installation protection in the form of a film, preferably a silicone paper, is then applied after drying, for example evaporation of the preferably halogen-free solvent. The installation protection can also be inserted as a pipe-shaped protection. The field controlling element that is applied as a coating does not impede the shrinking of the carrying inner insulation tube or sleeve and, since the field controlling element does not need to be shrunken, the heat demand is also smaller during the shrinking procedure, since only one shrinking tube is to be shrunken. Previously, two installation steps were necessary for this to occur. In addition, it is advantageous that it is impossible to mistake the previously standard field controlling tube for one of the shrinking insulation tubes. As already indicated, no more than two tubes must be inserted in one another for the customization of the cable fitting so that the diameter distance can be reduced. The coverage area of an inventive cable fitting is thereby significantly larger regarding the shrinking behavior, since the shrinkability of the individual tubes or sleeves can be matched more closely to one another. Given shrinking, the field controlling element that is applied as a coating on the inside surface of the inner insulation tube or sleeve is pressed better onto the cable geometry by the mechanical pressing power of the inner insulation sleeve that lies thereover, so that the described cavities are entirely filled The utilization of the previously standard field control band or, respectively, conductive lacquer may be foregone, at least in the region of the outer cable conductive layer edge.

The coverage area of the inventive cable fitting covers cable cross-section ranges of 95 mm² through 240 mm² or, respectively, 70 mm² to 150 mm², for example, given a 10 kV-medium voltage fitting.

Partial discharges that are still measured are now only $\leq 5$ pc (picocoulomb) given the inventive cable fitting.

Moreover, all necessary testing requirements for the cable fitting in the medium voltage range are also met.

Other advantages and features of the invention will be readily apparent from the following description of the preferred embodiments, the drawings and claims.

BRIEF DESCRIPTION OF THE DRAWINGS

FIG. 4 is a cross-sectional view of an inner insulation tube with a field controlling or shielding element that is applied as a continuous coating;

FIG. 5 is a longitudinal cross-sectional view of an inner insulation tube or sleeve with a field controlling or shielding element that is applied as an interrupted coating;

FIG. 6 is a side view showing the customized cable fitting before the installation according to the traditional prior art; and FIG. 7 is a side view showing a customized inventive cable fitting before installation of the present invention

DESCRIPTION OF THE PREFERRED EMBODIMENTS

Figure 1:
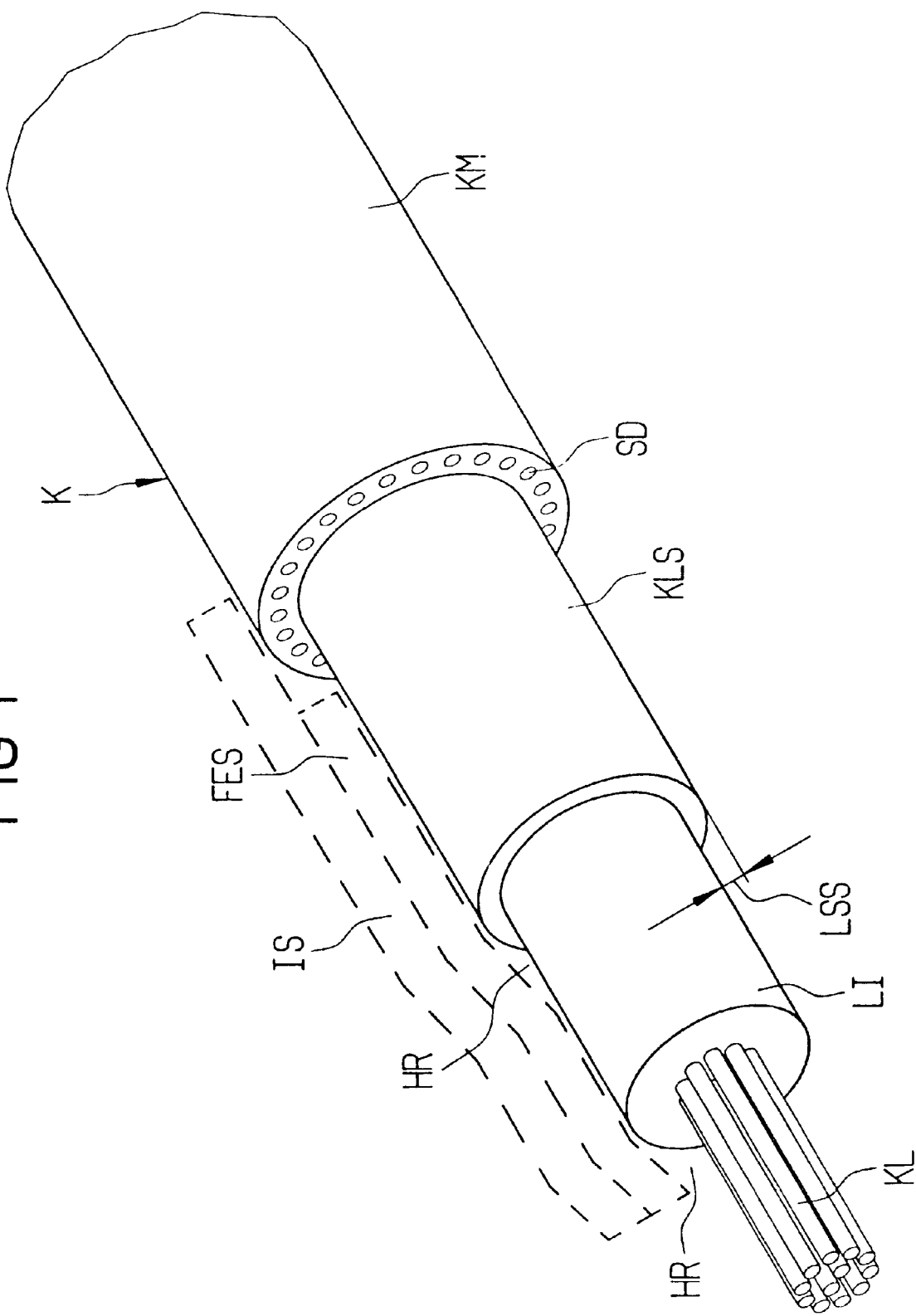
FIG. 1 is a perspective view of the end of a medium voltage cable that is to be connected.

FIG. 1 shows the end of a medium voltage cable K, wherein the individual layers are already set off for the pending connection. The covering cable envelope KM that has embedded shield wires SD can be seen and has been stripped back from the end of the cable. An electrically conductive cable connecting layer KLS, which is stripped in the required length, is arranged within this cable envelope KM. The cable conductive layer KLS exhibits a layer thickness LSS of approximately I mm. The conductor insulation LI that is stripped and set off in the corresponding length is disposed within the layer KLS. Finally, the electrical cable conductors KL that are to be connected are stripped of the insulation LI and these conductors are brought into abutment to the second cable end and are conductively connected with one another with a connecting element. As illustrated, the stripping of the various layers produces a step-like arrangement. FIG. 1 also shows the problematic nature regarding the occurrence of cavities HR, which occur when a shrinkable field controlling or shielding sleeve FES is shrunken on the set of partial regions of the cable K. After this field controlling sleeve FES is applied, at least one outer insulation tube IS is shrunken on according to the prior art.

Figure 2:
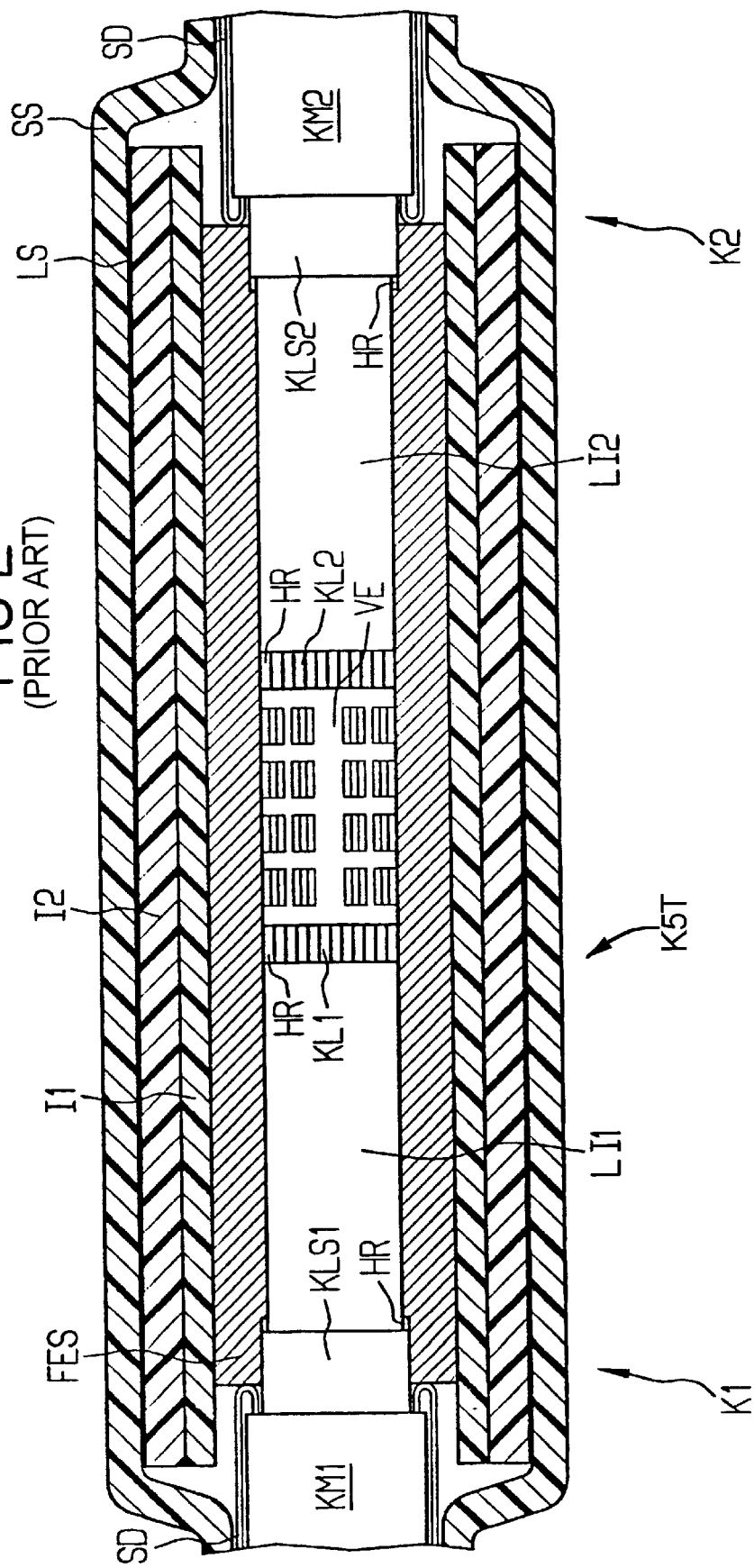
FIG. 2 is a longitudinal cross-sectional view of a cable fitting according to the prior art.
Figure 3:
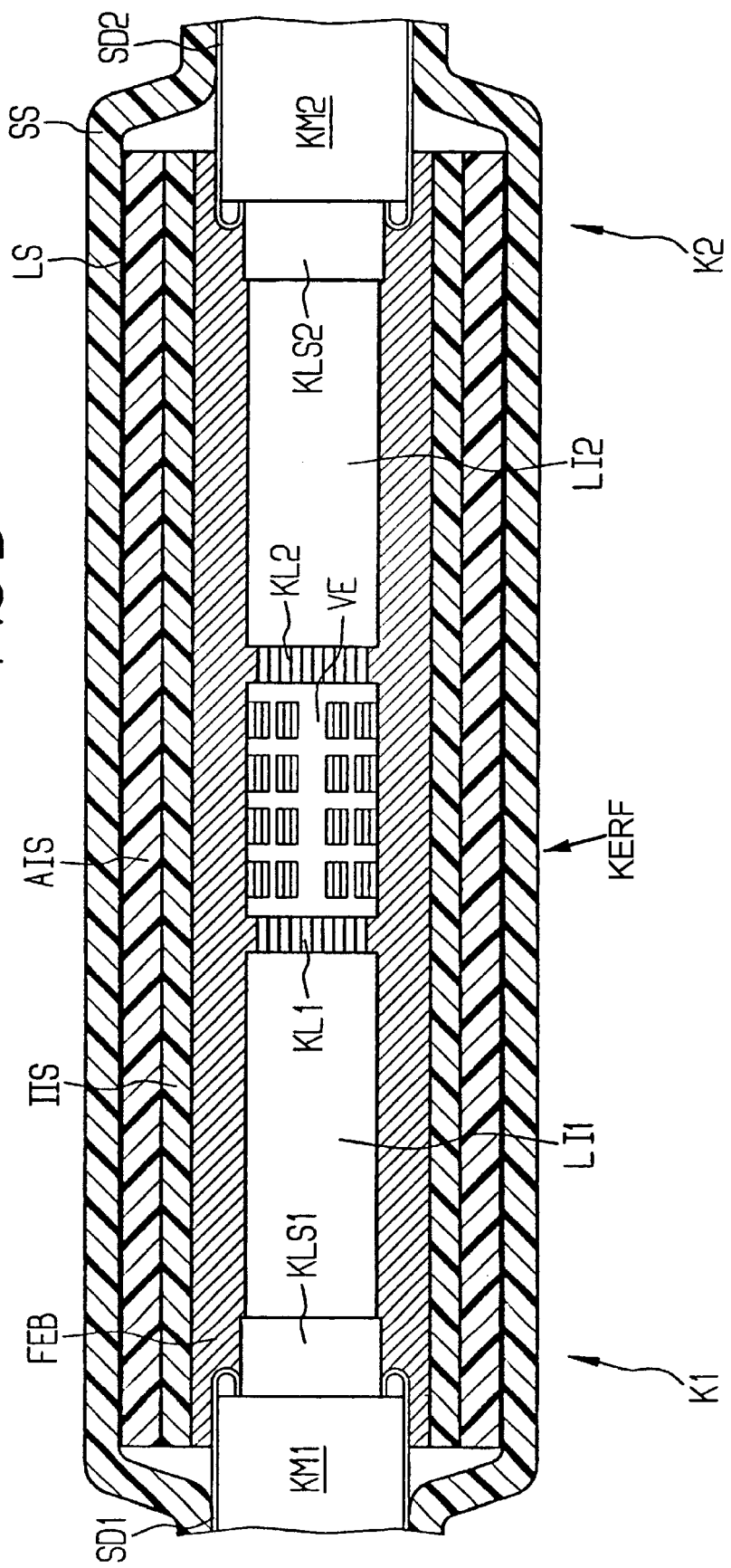
FIG. 3 is a longitudinal cross-sectional view of a cable fitting of the present invention.

The prior art device is shown in FIG. 2 for a cable fitting KST for medium voltage technology. It can be seen therein that both cable ends of the cables K1 and K2 that are to be connected are set off step-by-step corresponding to their layers that lie on top of one another. These individual layers are: cable envelopes KM1 and KM2, respectively; the cable conductive layers KLS1 and KLS2; the conductor insulations LI1 and LI2 and the cable conductors KL1 and KL2.

Both cable conductors KL1 and KL2 are conductively connected with one another with the aid of a conductive connecting element VE. According to the prior art, a shrinkable field controlling or shielding sleeve FES is shrunken over this set off area, whereby a forming of cavities HR, that can lead to partial discharges, can occur at the junctions of the individual cable layers. An inner insulation sleeve I1 is shrunken over the field controlling sleeve FES that has been shrunken on. An additional hose or insulation sleeves I2 with a conductive layer LS is also shrunken on this insulating tube I1. The protective sleeve or tube SS is shrunken over the entire unit. When the cable ends in the cable envelope additionally contain shield wires SD, they are folded back over the cable envelope and contacted in the corresponding, known manner, as warranted. This arrangement is also integrated into the protective tube SS. This known arrangement is not explicitly shown here.

In the present inventive embodiment, a cable fitting, generally indicated at KERF, has two ends of the cables K1 and K2 that are to be connected and are set off corresponding to their layers lying on top of one another in a way as the exemplary embodiment according to FIG. 2. However, what is different from the prior art is that the field controlling or shielding element FEB is applied as a coating onto the inside surface of the shrinkable inner insulation tube or sleeve IIS. The field controlling or shielding element FEB itself that is applied as a coating is no longer shrinkable; however, it does not impede the shrinking of the inner insulation sleeve IIS. However, the field controlling element FEB can be deformed, at least during the shrinking procedure, so that it can be pressed onto the individual layers of the ends of the cables K1 and K2, due to the shrinking forces of the inner insulation sleeve IIS, so that cavities can no longer occur. The danger of partial discharges is solved to the furthest extent, if not completely, because of the absence of these cavities. Besides, given the installation, it is particularly advantageous that only one shrinking procedure must be carried out given the application of this insulation sleeve IIS that is coated with the field controlling or shielding element FEB. For insulating purposes, the shrinkable outer insulation sleeve AIS with a conductive layer LS is shrunken onto the arrangement. Finally, the shrunken protective sleeve SS extends thereover. It is only indicated here that the shielding wires SD1 and SD2 can be arranged in the cable envelopes KM1 or, respectively, KM2, with the shielding wires then being contacted in a traditional way. These contacting arrangements can also, as warranted, be covered with the protective sleeve SS, which is known. Thus, it is advantageous that the field controlling or shielding element FEB, itself, is no longer shrinkable and forms one single unit with the shrinkable, inner insulation sleeve IIS that lies thereover. As already mentioned above, one shrinking procedure less is necessary given the present installation.

An exemplary embodiment for a combined inner insulation sleeve FEIS is illustrated in FIG. 4 and can be utilized in the inventive cable fitting. This is a shrinkable inner insulating sleeve IIS with a thickness ID of 0.5 mm through 6 mm, and preferably in a range of 1 mm to 5 mm, and a field shielding element FEB that is continuously applied onto the inside surface as a coating with a thickness BD of at least 1 mm and preferably 2 mm while in the non-shrunken expanded state of the insulation sleeve IIS.

In FIG. 5, a combined inner protection sleeve FELTIS, wherein the shrinkable inner insulation sleeve is utilized in turn and wherein the field shielding element FEBU is applied as a coating and the middle region, which comes to lie over the connection element, has an annular interruption. The same specifications for the thickness of the layers as mentioned with regard to the sleeve FEIS of FIG. 4 is present in the present device.

With the prior art cable fittings, the pre-customized elements of the cable fitting are already laterally slipped over one end of the cables that are to be connected. As illustrated in FIG. 6, a separate, shrinkable field controlling or shielding sleeve FES is inserted as a shielding element. An inner insulation sleeve I1 is then arranged over the field controlling sleeve FES. An outer insulation sleeve 12 is arranged over the inner sleeve I1 and a protective sleeve SS is arranged over the outer insulation sleeve 12. Given this cable fitting KST according to the prior art, all four sleeves are initially slipped loosely in one another and then applied from the inside following one another over the joint of the cable by shrinking. This means that four shrinking procedures following one another must be carried out to create this fitting.

In contrast thereto, and as illustrated in FIG. 7, the pre-customized inventive cable fitting KERF has only three sleeves which are arranged in one another in this case. Thus, according to the invention, the first shrinkable sleeve FEIS or FEUIS, which has the field controlling or shielding element that is applied as a coating on the inner surface of the insulation sleeve IIS, is slipped on the cable. The outer insulation sleeve AIS is slipped thereon and ultimately the protective sleeve SS is applied onto the outer insulation sleeve AIS. Therefore, only three sleeves are slipped in one another, which, as previously, are individually shrunken over the joint. According to the invention, only three shrinking procedures are therefore necessary given the insulation sleeve IIS that is coated with the field shielding element which can be applied in a continuous form, such as FEIS according to FIG. 4, or in interrupted form, such as FEUIS according to FIG. 5.

In addition, given the inventive embodiment, a further combination of sleeves can be obtained. The combination of the outer insulating sleeve AIS with the protective sleeve SS lying thereabove, for example, can be undertaken. The installation steps are thereby reduced, as well as the shrinking procedure. A combination can also occur between the inner insulation sleeve and the outer insulation sleeve, for example.

Although various minor modifications may be suggested by those versed in the art, it should be understood that I wish to embody within the scope of the patent granted hereon all such modifications as reasonably and properly come within the scope of my contribution to the art.

I claim:

1. A cable fitting for the protection of a cable connection in a medium voltage technology, wherein stripped cable conductors are connected to a conductive connecting element, a field shielding element covers the set off edges of the cable conductive layer, a shrinkable inner insulation sleeve, a shrinkable outer insulation sleeve, a conductive layer and a shrinkable protective sleeve that completely covers the arrangement are arranged lying on top of one another from inside to outside over the joint, the improvements comprising the field shielding element being arranged as a coating on the inside surface of a shrinkable inner insulation sleeve and the field shielding elements being deformable at least during the step of installation.

2. A cable fitting according to claim 1, wherein the field shielding element is arranged on the entire inside surface of the shrinkable inner insulation sleeve at least until the covering of both set off edges of the cable conductive layers.

3. A cable fitting according to claim 1, wherein the field shielding element is applied as a coating with an annular interrupt in the region of the connecting element.

4. A cable fitting according to claim 1, wherein the insulation sleeve exhibits values that are resistant to creep current and have a specific volume resistivity of at least $10^{10}$ $\Omega$cm.

5. A cable fitting according to claim 4, wherein the specific volume resistivity of the insulation sleeve is $10^{10}$ $\Omega$cm.

6. A cable fitting according to claim 1, wherein the field shielding element comprises a viscous, highly sticky polymer at room temperature, a highly volatile solvent at room temperature, an electrically conductive additive of granulated silicon carbonate, various additives and antioxidant agents that serve the purpose of making the element softer, wherein the solvent is halogen-free and exhibits an evaporation factor of <10 with reference to ester.

7. A cable fitting according to claim 1, wherein a thickness of the inner insulation sleeve is in a range of 0.5 mm to 6 mm in a non-shrunken, expanded state.

8. A cable fitting according to claim 7, wherein the thickness of the inner insulation sleeve is in a range of 1 mm to 5 mm in a non-shrunken, expanded state.

9. A cable fitting according to claim 1, wherein a thickness of the field shielding element that is applied as a coating is at least 1 mm in the non-shrunken state of the insulation sleeve.

10. A cable fitting according to claim 9, wherein the thickness of the field shielding element that is applied as a coating in a non-shrunken state is 2 mm.

11. A cable fitting according to claim 1, wherein the shrinkability of the insulation sleeves for the 20 kV cable fitting comprise a cable cross-section range of 95 mM$^2$ to 240 mm$^2$ for a cable having a cross-sectional range of 70 mm$^2$ to 150 mm$^2$.

12. A cable fitting according to claim 1, wherein electrical partial discharges in the region of the joint are <5 picocoulomb.

13. A method of forming a cable fitting between the ends of stripped cable conductors comprising the steps of assembling a first shrinkable sleeve having a field shielding element arranged on an inner surface thereof, and an additional shrinkable sleeve on one of the two cable conductors, joining said conductors together with a connection element, then slipping the first shrinkable sleeve onto the joined-together conductors, heating to shrink said sleeve with field shielding element onto the joint, then slipping the additional shrinkable sleeve onto the first-mentioned sleeve and heating to shrink it onto said first-mentioned sleeve.

14. A method according to claim 13, wherein the step of assembling the additional shrinkable sleeve provides a composite sleeve having a conductive layer interposed between two insulating layers.

\* \* \* \* \*